(12) United States Patent
Hattori

(10) Patent No.: US 11,541,331 B2
(45) Date of Patent: Jan. 3, 2023

(54) CHROMATOGRAPH

(71) Applicant: Shimadzu Corporation, Kyoto (JP)

(72) Inventor: Takanari Hattori, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 15/900,957

(22) Filed: Feb. 21, 2018

(65) Prior Publication Data

US 2018/0236376 A1 Aug. 23, 2018

(30) Foreign Application Priority Data

Feb. 23, 2017 (JP) .............................. JP2017-032080

(51) Int. Cl.
*B01D 15/16* (2006.01)
*B01D 15/40* (2006.01)
(Continued)

(52) U.S. Cl.
CPC .......... *B01D 15/163* (2013.01); *B01D 15/40* (2013.01); *G01N 30/32* (2013.01); *G01N 30/34* (2013.01);
(Continued)

(58) Field of Classification Search
CPC .......... G01N 2035/00178; G01N 2035/00326; G01N 2035/00633; G01N 2035/00643; G01N 2035/00653; G01N 2035/00702; G01N 2035/00851; G01N 2035/00881; G01N 2035/00891; G01N 2035/009; G01N 2035/0094; G01N 2035/0091; G01N 35/00584; G01N 35/00603;
(Continued)

(56) References Cited

U.S. PATENT DOCUMENTS

| | | | | |
|---|---|---|---|---|
| 4,311,586 A | * | 1/1982 | Baldwin ................ | B01D 15/08 210/101 |
| 4,597,943 A | * | 7/1986 | Sugiyama .............. | G01N 30/28 210/198.2 |
| 8,906,692 B2 | * | 12/2014 | Yokoyama ............. | G01N 30/84 422/70 |
| 2008/0048664 A1 | * | 2/2008 | Iwata ..................... | G01N 30/84 324/469 |

(Continued)

FOREIGN PATENT DOCUMENTS

| CN | 101275935 A | 10/2008 |
|---|---|---|
| CN | 102879508 A | 1/2013 |

(Continued)

OTHER PUBLICATIONS

Extended European Search Report dated Jun. 26, 2018, issued in counterpart European Application No. 18157958.2 (7 pages).

(Continued)

*Primary Examiner* — Nam X Nguyen
*Assistant Examiner* — Ekandra S. Miller-Cruz
(74) *Attorney, Agent, or Firm* — WHDA, LLP

(57) ABSTRACT

When a liquid in the column is replaced by carbon dioxide in a supercritical state in the chromatograph, an operation of a first pump is controlled by a flow rate control unit, and the carbon dioxide in the supercritical state is supplied at a constant pressure. Moreover, when a flow rate of the carbon dioxide in the supercritical state reaches a predetermined flow rate thereafter, the flow rate control unit controls an operation of the first pump so that the carbon dioxide in the supercritical state is supplied at a constant flow rate.

6 Claims, 5 Drawing Sheets

(51) Int. Cl.
  *G01N 30/32* (2006.01)
  *G01N 30/34* (2006.01)
  *G01N 30/86* (2006.01)
  *H04Q 9/02* (2006.01)

(52) U.S. Cl.
  CPC ... *G01N 30/8658* (2013.01); *G01N 2030/324* (2013.01); *G01N 2030/326* (2013.01); *G01N 2030/347* (2013.01); *H04Q 9/02* (2013.01)

(58) Field of Classification Search
  CPC ....... G01N 35/00613; G01N 35/00623; G01N 35/00693; G01N 35/00712; G01N 35/00871; G01N 2201/021; G01N 2201/024; G01N 2201/0245; G01N 2201/12; G01N 2201/126; G01N 35/00594; G01N 30/6039; G01N 30/6026; G01N 30/22; G01N 35/00; G01N 2030/8881; G01N 30/8658; G01N 2030/522; G01N 2035/00306; G01N 30/32; G01N 30/34; G01N 2030/324; G01N 2030/326; G01N 2030/347; B01D 15/08; B01D 15/10; B01D 15/22; B01D 15/163; B01D 15/40; B01L 2200/02; B01L 2200/028; B01L 2200/14; B01L 2200/143; B01L 2200/148; B01L 2300/02; B01L 2300/024; B01L 2300/046; H04Q 9/02
  USPC ......... 210/87, 143, 198.2, 635, 656; 422/70, 422/89; 436/161; 95/82; 73/19.02, 73/23.22, 23.35, 23.36, 61.52; 96/101, 96/102; 362/23.07, 23.08, 612
  See application file for complete search history.

(56) References Cited

U.S. PATENT DOCUMENTS

| | | | | |
|---|---|---|---|---|
| 2010/0162801 | A1* | 7/2010 | Hayashi | G01N 30/30 73/61.57 |
| 2010/0252502 | A1* | 10/2010 | Witt | F04B 11/0058 210/656 |
| 2012/0006750 | A1* | 1/2012 | Miyazawa | B01D 15/40 210/656 |
| 2013/0018598 | A1* | 1/2013 | Ohashi | G01N 30/34 702/25 |
| 2013/0340508 | A1* | 12/2013 | Osaka | G01N 30/468 73/61.53 |
| 2016/0202218 | A1 | 7/2016 | Owa | |

FOREIGN PATENT DOCUMENTS

| | | | | |
|---|---|---|---|---|
| CN | 105017401 A | | 11/2015 | |
| CN | 105784856 A | | 7/2016 | |
| JP | 2014215195 A | * | 11/2014 | ............ G01N 30/02 |
| JP | 2015-194363 A | | 11/2015 | |
| WO | 2009/062538 A1 | | 5/2009 | |
| WO | 2013/062635 A2 | | 5/2013 | |
| WO | 2014/055638 A1 | | 4/2014 | |

OTHER PUBLICATIONS

Office Action, dated Mar. 3, 2021, issued in counterpart Chinese Application No. 201810155318.5 (w/ English machine translation; 18 pages).

Office Action dated Jun. 30, 2020, issued in counterpart CN Application No. 201810155318.5, with English translation (17 pages).

* cited by examiner

CHROMATOGRAPH

BACKGROUND OF THE INVENTION

Field of the Invention

The present invention relates to a chromatograph that supplies a mobile phase, which includes a liquid or a supercritical fluid, to a column.

Description of the Related Art

Heretofore, a chromatograph using a liquid or a supercritical fluid as a mobile phase has been used. In this type of chromatograph, a mobile phase stored in a reservoir is sent toward a column at a constant flow rate. Then, a sample is injected into the mobile phase, sample components contained in the mobile phase are temporally separated from one another in the column, and the separated sample components are detected in a detector (for example, see JP-A-2015-194363).

In the chromatograph as described above, the mobile phase introduced into the column may be replaced by a different mobile phase. For example, in the chromatograph, in the case of making a change from an analysis using a mobile phase as a liquid to an analysis using a mobile phase as a supercritical fluid, or in the case of making an analysis by changing a liquid type of the mobile phase, the analysis is started after replacing the mobile phase, which is introduced in the column, by a mobile phase for use in such a new analysis.

Here, the liquid and the supercritical fluid, which are used as the mobile phases in the chromatograph, have viscosity. Moreover, the viscosity varies depending on the type of mobile phase. Therefore, when the mobile phase is supplied at a flow rate according to the new analysis in a state in which the previous mobile phase remains in the column (a state in which the column is not completely replaced by the new mobile phase), a pressure of the column may rise sharply. In this case, an excessive pressure is applied to the column, which causes a deterioration of the column. Therefore, in such a case, the new mobile phase is supplied at a low flow rate, an inside of the column is completely replaced by the new mobile phase, thereafter, the flow rate is changed to a flow rate suitable for the new analysis, and the mobile phase is supplied.

SUMMARY OF THE INVENTION

In the case of using the conventional chromatograph as described above, usually, a user monitors the pressure, thereby confirming that the replacement of the mobile phase is completed in the column. Thereafter, the user manually sets the flow rate of the mobile phase. In the chromatograph, the new mobile phase is supplied toward the column at a constant flow rate based on the setting contents. As described above, the use of the conventional chromatograph requires that the user monitor the pressure and manually set the flow rate of the mobile phase. Accordingly, the use of the conventional chromatograph makes operations by the user complicated.

The present invention has been made in view of the above circumstances. It is an object of the present invention to provide a chromatograph capable of suppressing application of an excessive pressure to the column and improving operability for the user in the case of replacing the mobile phase in the column by the mobile phase having different viscosity.

(1) A chromatograph according to the present invention includes: a column; a mobile phase supply unit; and a flow rate control unit. The mobile phase supply unit supplies a mobile phase, which includes a liquid or a supercritical fluid, to the column. The flow rate control unit controls a flow rate of the mobile phase supplied from the mobile phase supply unit to the column. When a first mobile phase in the column is replaced by a second mobile phase having different viscosity, the flow rate control unit controls a flow rate of the second mobile phase so that the second mobile phase is supplied at a constant pressure, and is supplied at a constant flow rate after reaching a predetermined flow rate.

With such a configuration, in the chromatograph, when the first mobile phase in the column is replaced by the second mobile phase having different viscosity, the flow rate control unit controls the flow rate of the second mobile phase so that the second mobile phase is supplied at a constant pressure.

Therefore, application of an excessive pressure to the column can be prevented when the first mobile phase in the column is replaced by the second mobile phase.

Moreover, when the flow rate of the second mobile phase reaches a predetermined flow rate thereafter, the flow rate control unit controls the flow rate of the second mobile phase so that the second mobile phase is supplied at a constant flow rate.

Therefore, an operation for supplying the mobile phase in the chromatograph can be automated, and the operability for the user can be improved.

(2) Moreover, the chromatograph may further include a setting receiving unit. The setting receiving unit receives settings of a pressure and a flow rate. When the first mobile phase in the column is replaced by the second mobile phase having different viscosity, the flow rate control unit may control the flow rate of the second mobile phase so that the second mobile phase is supplied at a pressure of which setting is received by the setting receiving unit, and is supplied at a constant flow rate after reaching a flow rate of which setting is received by the setting receiving unit.

With such a configuration, the pressure and flow rate of the second mobile phase when the first mobile phase in the column is replaced by the second mobile phase having different viscosity can be arbitrarily set.

Therefore, when the first mobile phase in the column is replaced by the second mobile phase having different viscosity, the second mobile phase can be supplied at an appropriate pressure. Moreover, the second mobile phase can be supplied at a constant flow rate after the flow rate thereof reaches an appropriate flow rate.

(3) Moreover, the chromatograph may further include: a display unit; and a display control unit. The display control unit may cause the display unit to display a setting screen for setting the pressure and the flow rate. The setting receiving unit may receive settings of the pressure and the flow rate in the setting screen.

With such a configuration, the pressure and flow rate of the second mobile phase can be appropriately set based on the setting screen displayed on the display unit.

(4) Moreover, when a first liquid in the column is replaced by a second liquid having higher viscosity than the first liquid, the flow rate control unit may control a flow rate of the second liquid so that the second liquid is supplied at a constant pressure, and is supplied at a constant flow rate after reaching a predetermined flow rate.

With such a configuration, in the case of changing a type of the liquid of the mobile phase and performing the analysis in the chromatograph, an excessive pressure can be suppressed from being applied to the column, and the operability for the user can be improved.

(5) Moreover, when the liquid in the column is replaced by the supercritical fluid, the flow rate control unit may control a flow rate of the supercritical fluid so that the supercritical fluid is supplied at a constant pressure, and is supplied at a constant flow rate after reaching a predetermined flow rate.

With such a configuration, in the chromatograph, in the case of making a change from an analysis using the mobile phase as the liquid to the mobile phase as the supercritical fluid, an excessive pressure can be suppressed from being applied to the column, and the operability for the user can be improved.

According to the present invention, when the first mobile phase in the column is replaced by the second mobile phase having different viscosity, the flow rate control unit controls the flow rate of the second mobile phase so that the second mobile phase is supplied at a constant pressure. Therefore, the application of an excessive pressure to the column can be suppressed when the first mobile phase in the column is replaced by the second mobile phase. Moreover, when the flow rate of the second mobile phase reaches a predetermined flow rate thereafter, the flow rate control unit controls the flow rate of the second mobile phase so that the second mobile phase is supplied at a constant flow rate. Therefore, the operation for supplying the mobile phase in the chromatograph can be automated, and the operability for the user can be improved.

DETAILED DESCRIPTION OF THE PREFERRED EMBODIMENTS

1. Overall Configuration of Chromatograph

Figure 1:
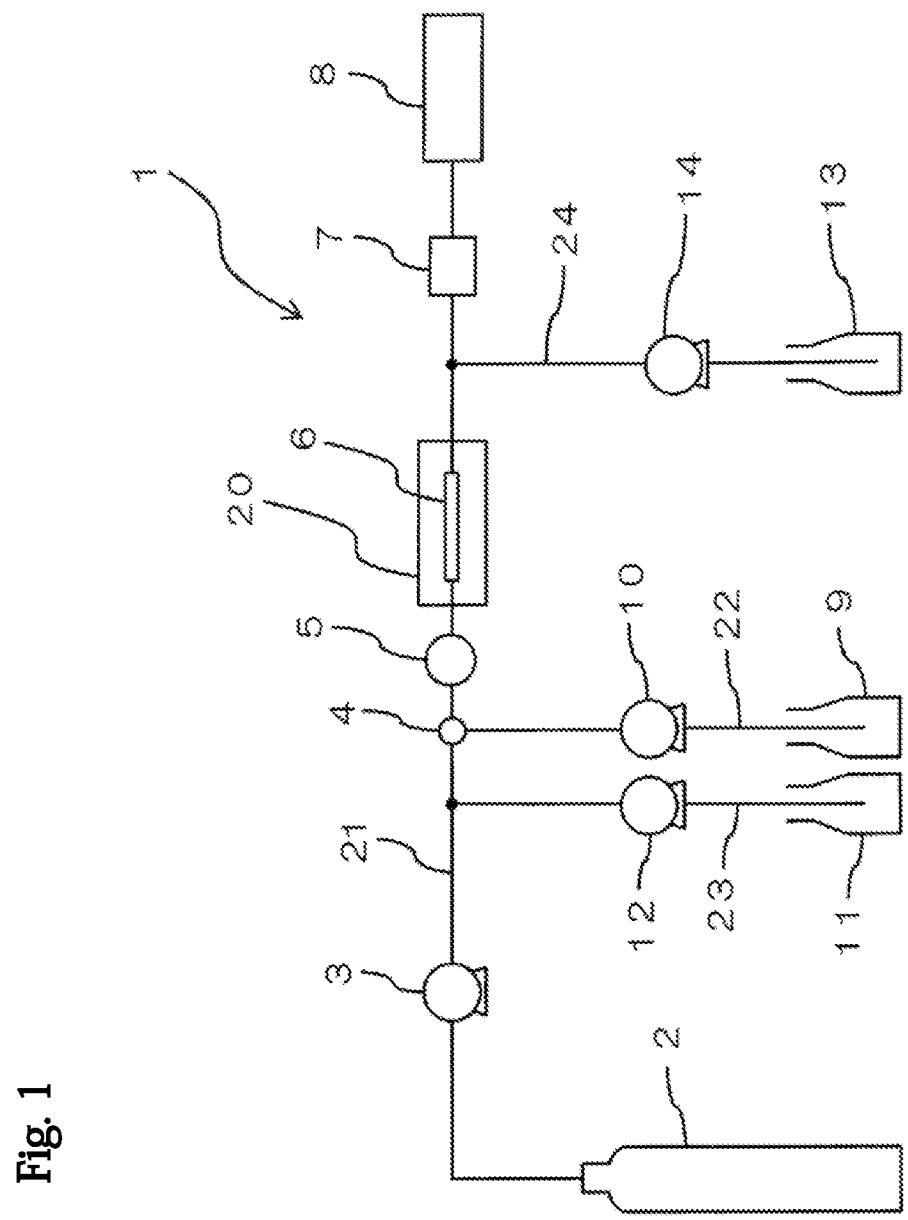
FIG. 1 is a schematic diagram showing a configuration of a chromatograph according to an embodiment of the present invention.

FIG. 1 is a schematic diagram showing a configuration of a chromatograph 1 according to an embodiment of the present invention.

The chromatograph 1 is a device that supplies a mobile phase, which includes a liquid or a supercritical fluid, to a column 6. That is, the chromatograph 1 functions as either one of a liquid chromatograph and a supercritical fluid chromatograph. The chromatograph 1 includes, as flow paths: a first flow path 21; a second flow path 22 connected to an intermediate portion of the first flow path 21 via a mixer 4; a third flow path 23 connected to an intermediate portion of the first flow path 21, which is an intermediate portion upstream of the mixer 4 in an inflow direction (moving direction of the fluid); and a fourth flow path 24 connected to an intermediate portion of the first flow path 21, which is an intermediate portion downstream of the mixer 4 in the inflow direction (moving direction of the fluid).

A first reservoir 2, a first pump 3, the mixer 4, a sample introduction portion 5, the column 6, a back pressure valve 7, and a mass spectrometer 8 are disposed in this order in the inflow direction in the first flow path 21.

Liquid carbon dioxide is stored in the first reservoir 2. This liquid carbon dioxide is supplied toward the column 6 when the chromatograph 1 is used as a supercritical fluid chromatograph.

The sample introduction portion 5 is, for example, an automatic sampler.

The column 6 is a separation column, which is accommodated in a column oven 20 and heated.

The back pressure valve 7 is configured to keep an inside of the first flow path 21 at a constant pressure in order to maintain a state of the supercritical fluid when the supercritical fluid is moved as a mobile phase in the first flow path 21.

In the second flow path 22, a second reservoir 9 and a second pump 10 are disposed in this order in an inflow direction.

In the third flow path 23, a third reservoir 11 and a third pump 12 are disposed in this order in an inflow direction.

Note that the first pump 3, the second pump 10, and the third pump 12 constitute an example of a mobile phase supply unit.

In the second reservoir 9 and the third reservoir 11, for example, water, acetonitrile, ethanol or the like is stored. A type of the liquid stored in the second reservoir 9 is different from a type of the liquid stored in the third reservoir 11.

In the fourth flow path 24, a fourth reservoir 13 and a fourth pump 14 are disposed in this order in an inflow direction. In the fourth reservoir 13, a makeup solution is reserved. The makeup solution is, for example, a solution containing an ionization accelerator such as formic acid and ammonia in an organic solvent such as methanol or water.

In the case of using the chromatograph 1 as a liquid chromatograph, the first pump 3 is not operated, and either one of the second pump 10 and the third pump 12, or both of the second pump 10 and the third pump 12 are operated. When either one of the second pump 10 and the third pump 12 is operated, the liquid from either one of the second reservoir 9 and the third reservoir 11 flows as a mobile phase into the first flow path 21. When both the second pump 10 and the third pump 12 are operated, the liquid in the second reservoir 9 and the liquid in the third reservoir 11 are mixed with each other by the mixer 4. Then, a resultant mixed liquid becomes the mobile phase.

Then, a sample is injected into the first flow path 21 from the sample introduction portion 5. The sample is transported to the column 6 by the mobile phase as the liquid, is separated for each of the components, and is introduced into the mass spectrometer 8 from the column 6. Then, sample components are detected in the mass spectrometer 8. At this time, in order to promote ionization of the sample components in the mass spectrometer 8, the makeup solution is supplied from the fourth reservoir 13 to the mass spectrometer 8 via the fourth flow path 24 and the first flow path 21 by an operation of the fourth pump 14.

Moreover, in the case of using the chromatograph 1 as a supercritical fluid chromatograph, only the first pump 3 or both of the first pump 3 and the second pump 10 are operated. When only the first pump 3 is operated, carbon dioxide is delivered to the first flow path 21 from the first reservoir 2. When both of the first pump 3 and the second pump 10 are operated, carbon dioxide is delivered from the first reservoir 2 to the first flow path 21. In addition, a liquid from the second reservoir 9 flows as a polar solvent into the first flow path 21. The carbon dioxide and the liquid are mixed with each other by the mixer 4.

Then, a pressure of the back pressure valve 7 is applied to a resultant mixture, whereby the carbon dioxide is brought into a supercritical state. The carbon dioxide (supercritical fluid) brought into the supercritical state is supplied as a mobile phase toward the column 6. Furthermore, the sample is injected into the first flow path 21 from the sample introduction portion 5. The sample is transported to the column 6 by the carbon dioxide in the supercritical state, is separated for each of the components, and is introduced into the mass spectrometer 8 from the column 6 via the back pressure valve 7. Then, the sample components are analyzed in the mass spectrometer 8. At this time, in a similar way to the above, the makeup solution is supplied from the fourth reservoir 13 to the mass spectrometer 8 via the fourth flow path 24 and the first flow path 21 by the operation of the fourth pump 14.

Note that a detector other than the mass spectrometer 8 is usable in the chromatograph 1.

Figure 2:
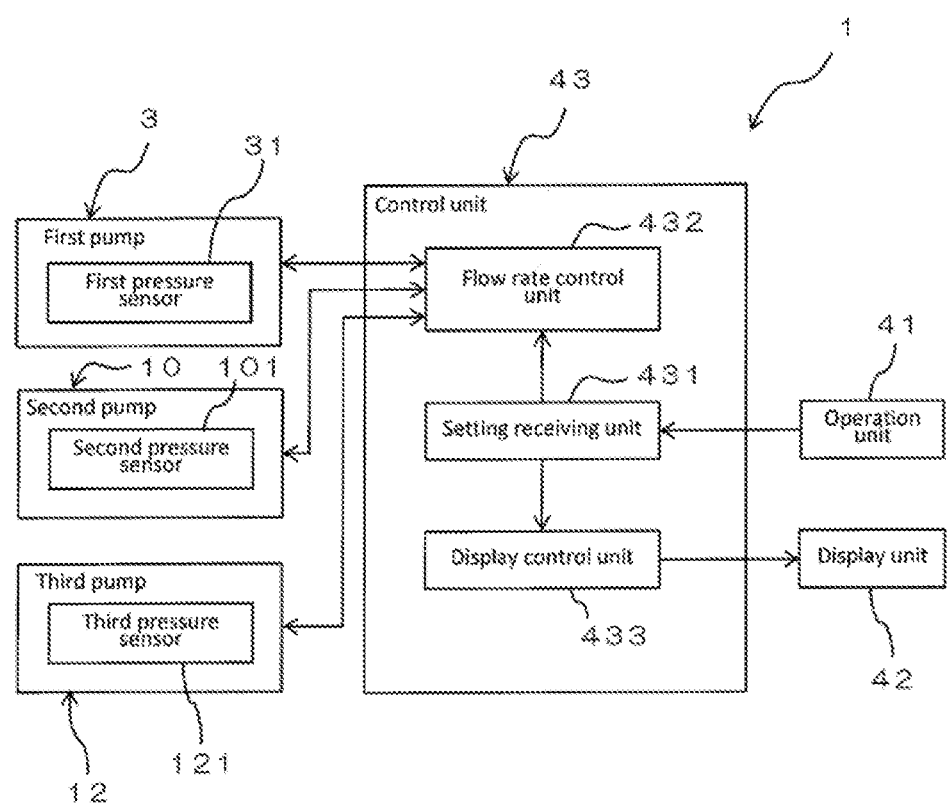
FIG. 2 is a block diagram showing an electric configuration of a control unit and members surrounding the control unit.

2. Electric Configuration of Control Unit and Members Surrounding the Control Unit FIG. 2 is a block diagram showing an electric configuration of a control unit and members surrounding the control unit.

The chromatograph 1 includes an operation unit 41, a display unit 42 and a control unit 43 in addition to the first pump 3, the second pump 10 and the third pump 12, which are described above.

The first pump 3 includes a first pressure sensor 31 that detects a pressure of the fluid (carbon dioxide) flowing through the first flow path 21 when the first pump 3 is operated.

The second pump 10 includes a second pressure sensor 101 that detects a pressure of the liquid flowing through the second flow path 22 when the second pump 10 is operated.

The third pump 12 includes a third pressure sensor 121 that detects a pressure of the liquid flowing through the third flow path 23 when the third pump 12 is operated.

The operation unit 41 includes, for example, a keyboard and a mouse.

The display unit 42 can include, for example, a liquid crystal display or the like.

For example, the control unit 43 includes a central processing unit (CPU), and the respective units such as the first pump 3, the second pump 10, the third pump 12, the operation unit 41 and the display unit 42 are electrically connected to the control unit 43. The CPU executes a program, whereby the control unit 43 functions as a setting receiving unit 431, a flow rate control unit 432, a display control unit 433 and the like.

The setting receiving unit 431 receives settings related to analysis conditions (to be described later) input by a user using the operation unit 41.

The flow rate control unit 432 controls operations of the first pump 3, the second pump 10 and the third pump 12 based on signals from the first pump 3, the second pump 10 and the third pump 12 (that is, signals from the first pressure sensor 31, the second pressure sensor 101 and the third pressure sensor 121), and based on setting contents received by the setting receiving unit 431. Moreover, the flow rate control unit 432 calculates flow rate of the fluids supplied individually by the first pump 3, the second pump 10 and the third pump 12 based on the respective operations (speeds) of the first pump 3, the second pump 10 and the third pump 12.

The display control unit 433 performs a process for causing the display unit 42 to display the setting contents received by the setting receiving unit 431.

3. Screen Configuration of Setting Screen

Figure 3:
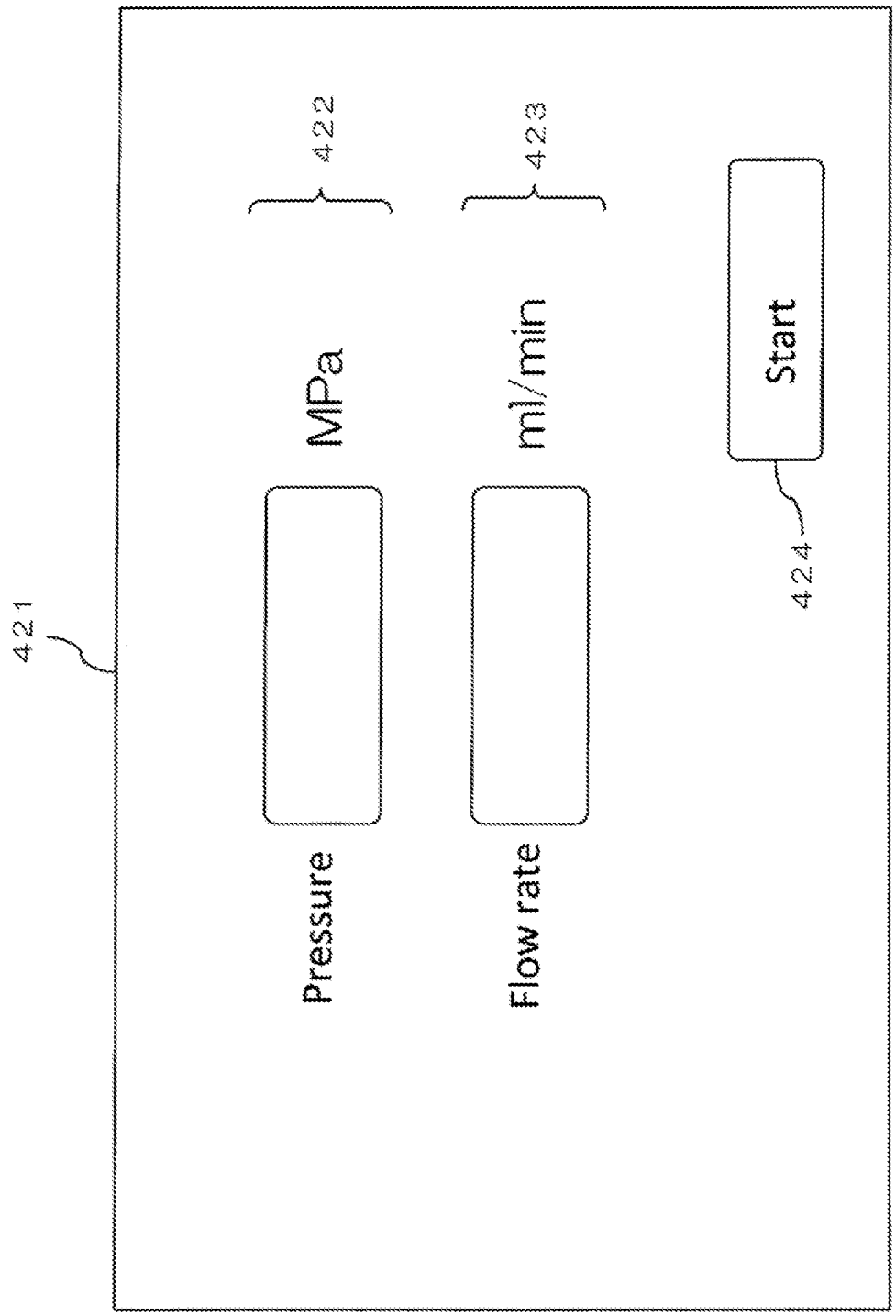
FIG. 3 is a schematic diagram showing a display mode of a setting screen displayed on a display unit.

FIG. 3 is a schematic diagram showing a display mode of a setting screen 421 displayed on the display unit 42.

The setting screen 421 is displayed on the display unit 42 in response to a predetermined operation performed on the operation unit 41 by the user.

The setting screen 421 is provided with a pressure display area 422 and a flow rate display area 423. Furthermore, a start button 424 is displayed on the setting screen 421.

The pressure display area 422 is an area for setting a supply pressure of a new mobile phase when the mobile phase, which is introduced in the column 6, is replaced by a different mobile phase (new mobile phase). The user can set the supply pressure and display a value of the supply pressure on the pressure display area 422 by operating the operation unit 41.

The flow rate display area 423 is an area for setting a supply flow rate of the new mobile phase when the mobile phase, which is introduced in the column 6, is replaced by the different mobile phase (new mobile phase). The user can set the supply flow rate and display a value of the supply flow rate on the flow rate display area 423 by operating the operation unit 41.

The start button 424 is a button for starting a replacement of the mobile phase in the column 6 based on the contents set on the setting screen 421, and the start button 424 is selected by an operation for the operation unit 41.

4. Control Operations of Control Unit

The chromatograph 1 is used as either one of the liquid chromatograph and the supercritical fluid chromatograph as described above. Therefore, in the chromatograph 1, prior to the analysis operation, the operation of replacing the mobile phase in the column 6 by a mobile phase suitable for the analysis operation is performed. For example, when the chromatograph 1 is used as the liquid chromatograph and then used as the supercritical fluid chromatograph, the liquid in the column 6 is replaced by the supercritical fluid (carbon dioxide in a supercritical state). Moreover, when the chromatograph 1 is used as the supercritical fluid chromatograph and then used as the liquid chromatograph, the supercritical fluid (carbon dioxide in a supercritical state) in the column 6 is replaced by the liquid.

In the chromatograph 1, in the case of replacing the mobile phase in the column 6 by the mobile phase having different viscosity, the pressure of the column 6 may rise sharply.

Therefore, in the present embodiment, the control operations by the control unit 43 are performed as described below. In this example, a description will be given of a case that the chromatograph 1 is used as the liquid chromatograph and then used as the supercritical fluid chromatograph.

Figure 4:
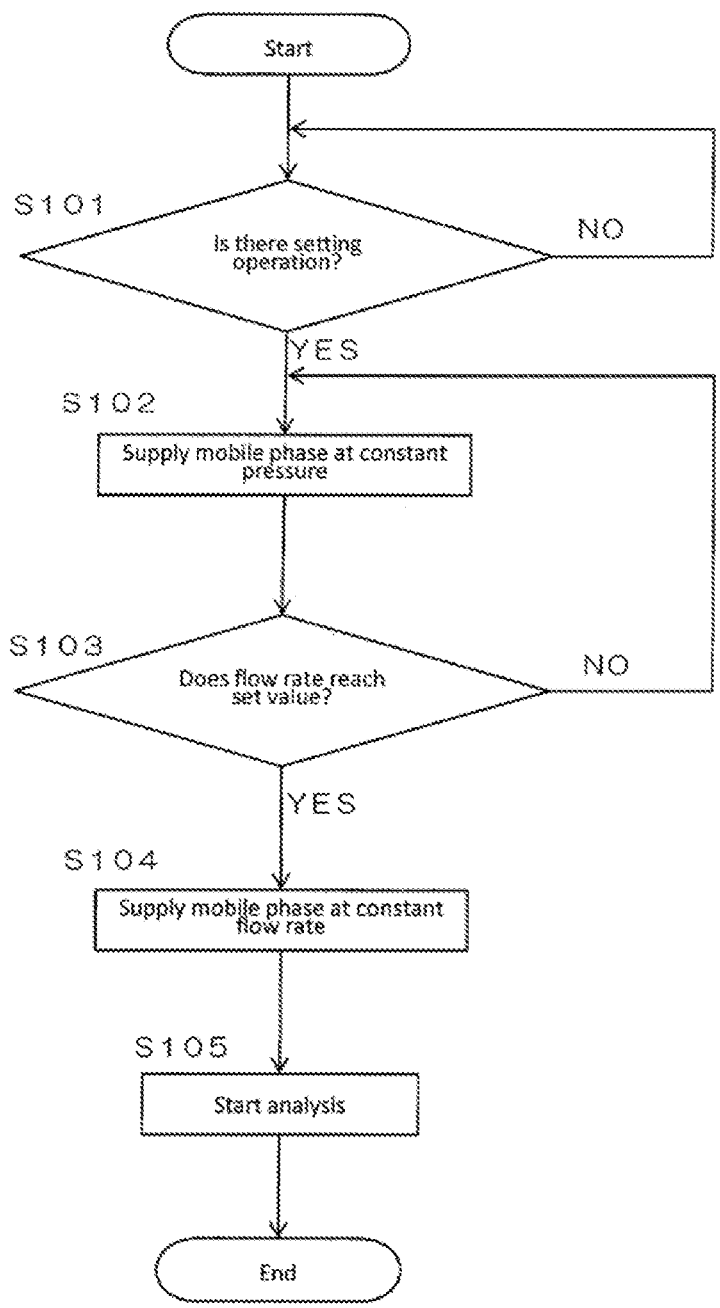
FIG. 4 is a flowchart showing an example of control operations of the control unit.

FIG. 4 is a flowchart showing an example of the control operations of the control unit 43.

In a state in which the chromatograph 1 is used as the liquid chromatograph, the liquid is introduced into the column 6. Moreover, an icon (not shown) for starting the analysis operation of the supercritical fluid chromatograph (that is, for starting the replacement) is displayed on the display unit 42.

In the case of using the chromatograph 1 as the supercritical fluid chromatograph, the user operates the operation unit 41 and selects this icon on the display unit 42 in a state in which the analysis operation is stopped.

Then, the display control unit 433 displays the setting screen 421 (see FIG. 3) on the display unit 42.

Then, on the setting screen 421, the user sets the pressure and flow rate of the carbon dioxide when replacing the liquid in the column 6 by the carbon dioxide in the supercritical state. Specifically, by operating the operation unit 41, the user inputs a predetermined pressure in the pressure display area 422, and inputs a predetermined flow rate in the flow rate display area 423. Then, the setting receiving unit 431 receives these settings (inputs). Moreover, the display control unit 433 displays the contents received by the setting receiving unit 431, that is, information (numerical values), which is input by the user, individually in the pressure display area 422 and the flow rate display area 423. Note that, in this example, it is assumed that, for example, the pressure is set to 20 MPa and the flow rate is set to 3 ml/min by the user.

Thereafter, the user selects the start button 424 by operating the operation unit 41. The setting receiving unit 431 receives an input from the start button 424. Then, the flow rate control unit 432 starts the operation of replacing the liquid in the column 6 by the carbon dioxide in the supercritical state in response to the fact that the setting receiving unit 431 has received a series of settings (input in the pressure display area 422, input in the flow rate display area 423, and selection of the start button 424) (YES in Step S101).

Specifically, the flow rate control unit 432 operates the first pump 3 so that the pressure of the carbon dioxide supplied from the first reservoir 2 by the first pump 3, that is, the pressure detected by the first pressure sensor 31 (see FIG. 2) becomes the pressure of which setting is received by the setting receiving unit 431 (Step S102). In this example, the flow rate control unit 432 operates the first pump 3 so that the pressure detected by the first pressure sensor 31 is kept at 20 MPa. In this way, the carbon dioxide in the supercritical state is supplied to the column 6 at a constant pressure (20 MPa).

Moreover, the flow rate control unit 432 calculates the flow rate of the carbon dioxide supplied by the first pump 3 based on the operation (speed) of the first pump 3. In this case, the flow rate of the carbon dioxide supplied by the first pump 3 gradually increases.

Then, when the flow rate calculated by the flow rate control unit 432 reaches the flow rate of which setting is received by the setting receiving unit 431 (YES in Step S103), the flow rate control unit 432 operates the first pump 3 so that the flow rate of the carbon dioxide supplied by the first pump 3 is kept at the relevant flow rate (flow rate of which setting is received by the setting receiving unit 431) (Step S104).

In this example, when the calculated flow rate of the carbon dioxide reaches 3 ml/min, the flow rate control unit 432 thereafter operates the first pump 3 so that the flow rate of the carbon dioxide supplied by the first pump 3 is kept at 3 ml/min. In this way, the carbon dioxide in the supercritical state is supplied to the column 6 at a constant flow rate (3 ml/min). Then, in this state, the analysis operation is started in the chromatograph 1 (Step S105).

Figure 5:
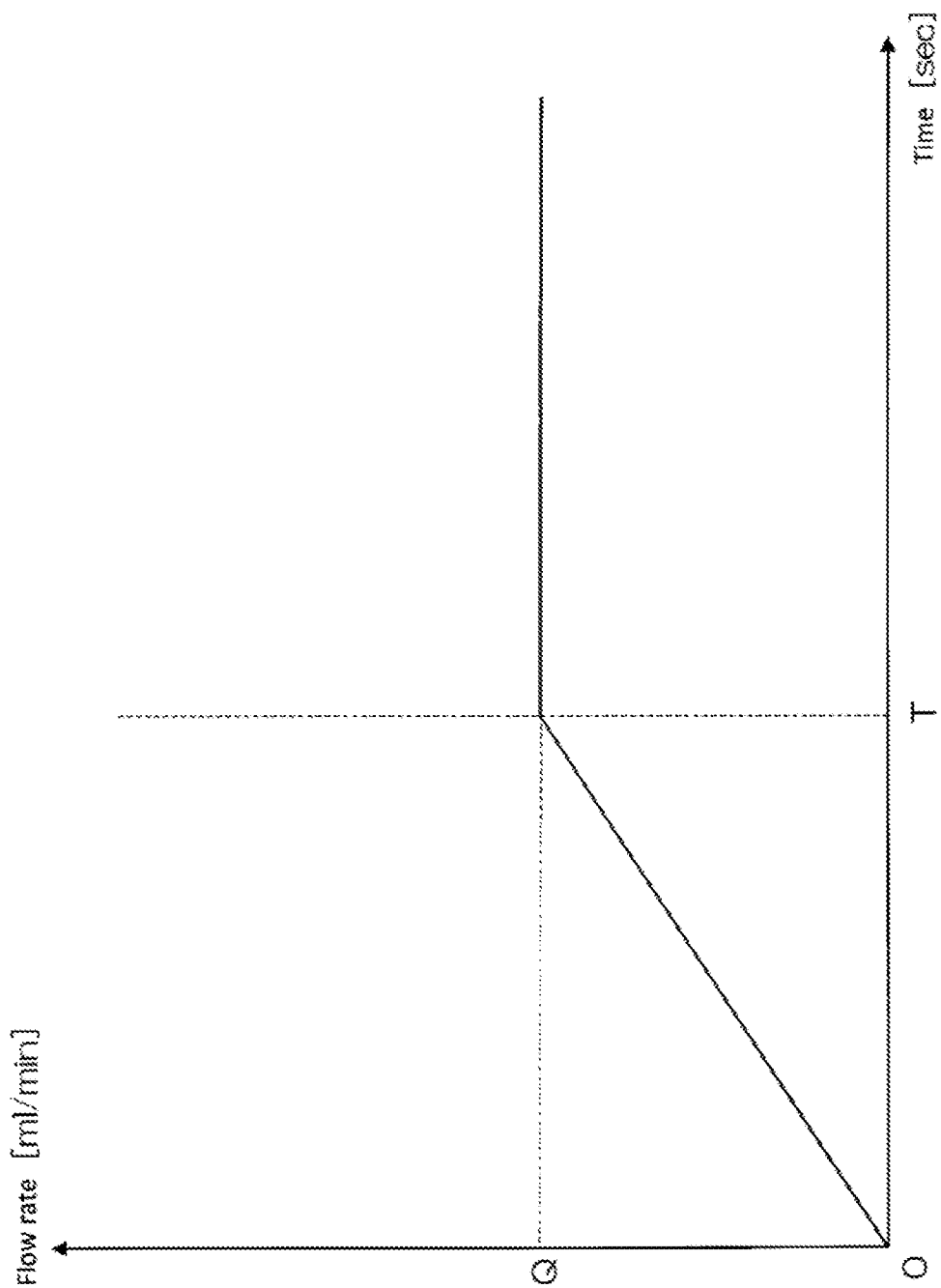
FIG. 5 is a graph showing a change over time in a flow rate of carbon dioxide when a liquid in a column is replaced by carbon dioxide in a supercritical state.

FIG. 5 is a graph showing a change over time in the flow rate of the carbon dioxide when the liquid in the column 6 is replaced by the carbon dioxide in the supercritical state.

As described above, in the case of replacing the liquid in the column 6 by the carbon dioxide in the supercritical state, the flow rate control unit 432 first operates the first pump 3 at a constant pressure. In this way, as shown in the graph of FIG. 5, the flow rate of the carbon dioxide supplied by the first pump 3 gradually increases.

Then, after a time T when a predetermined flow rate Q is reached, the first pump 3 is operated at a constant flow rate so as to keep the flow rate Q. Note that the flow rate Q is 3 ml/min in this example.

5. Function and Effect (1) In the present embodiment, when the liquid in the column 6 is replaced by the supercritical fluid (carbon dioxide in the supercritical state) having different viscosity in the chromatograph 1, the operation of the first pump 3 is controlled by the flow rate control unit 432, and the carbon dioxide in the supercritical state is supplied at a constant pressure (Step S102 in FIG. 4).

Therefore, an excessive pressure can be suppressed from being applied to the column 6 when the liquid in the column 6 is replaced by the carbon dioxide in the supercritical state (when making a change from the analysis using the mobile phase of the liquid to the analysis using the mobile phase of the supercritical fluid).

Moreover, when the flow rate of the carbon dioxide in the supercritical state reaches the predetermined flow rate thereafter, the flow rate control unit 432 controls the operation of the first pump 3 so that the carbon dioxide in the supercritical state is supplied at a constant flow rate (Step S104 in FIG. 4).

Therefore, the operation for supplying the carbon dioxide in the supercritical state in the chromatograph 1 can be automated, and the operability for the user can be improved.

(2) Moreover, in the present embodiment, as shown in FIG. 2, when the liquid in the column 6 is replaced by the carbon dioxide in the supercritical state, the flow rate control unit 432 controls the operation of the first pump 3 so that the carbon dioxide in the supercritical state is supplied at the pressure of which setting is received by the setting receiving unit 431, and that the carbon dioxide is supplied at a constant flow rate after reaching the flow rate of which setting is received by the setting receiving unit 431.

Therefore, the pressure and flow rate of the carbon dioxide when the liquid in the column 6 is replaced by the carbon dioxide in the supercritical state can be arbitrarily set.

As a result, the carbon dioxide can be supplied at an appropriate pressure when the liquid in the column 6 is replaced by the carbon dioxide in the supercritical state. Furthermore, the carbon dioxide can be supplied at a constant flow rate after the flow rate thereof reaches an appropriate flow rate.

(3) Moreover, in the present embodiment, the display control unit 433 causes the display unit 42 to display the setting screen 421 for setting the pressure and the flow rate. The setting receiving unit 431 receives the settings of the pressure and the flow rate on the setting screen 421.

Therefore, the pressure and flow rate of the carbon dioxide in the supercritical state can be appropriately set based on the setting screen 421 displayed on the display unit 42.

6. Second Embodiment

In the first embodiment described above, when the chromatograph 1 is used as the liquid chromatograph and then used as the supercritical fluid chromatograph, the pressure and flow rate of the carbon dioxide in the supercritical state are controlled.

In contrast, in a second embodiment, in the case of changing the mobile phase and performing the analysis in a state in which the chromatograph 1 is used as the liquid chromatograph, the pressure and flow rate of the mobile phase are controlled.

Specifically, in the second embodiment, in the chromatograph 1 shown in FIG. 1, the first pump 3 is not operated, and only the second pump 10, only the third pump 12, or both of the second pump 10 and the third pump 12 are operated. When only the second pump 10 is operated, the liquid is delivered from the second reservoir 9, when only the third pump 12 is operated, the liquid is delivered from the third reservoir 11, and when both of the second pump 10 and the third pump 12 are operated, the liquids are delivered from the second reservoir 9 and the third reservoir 11. The liquids thus delivered are introduced into the column 6.

In this example, it is assumed that acetonitrile, which is a low viscous liquid, is introduced into the column 6.

In this state, an icon (not shown) for changing the mobile phase is displayed on the display unit 42. Then, in the case of changing the liquid in the column 6 to a highly viscous liquid, the user operates the operation unit 41 and selects this icon on the display unit 42 in a state in which the analysis operation is stopped. For example, in this example, the user selects this icon in the case of changing the liquid in column 6 to water having higher viscosity than acetonitrile.

Then, the display control unit 433 causes the display unit 42 to display the setting screen 421.

Thereafter, in the same manner as the control for the first pump 3 in the first embodiment, the flow rate control unit 432 controls the pump (either one of the second pump 10 and the third pump 12) corresponding to the reservoir (either one of the second reservoir 9 and the third reservoir 11) that stores the water.

As described above, in the second embodiment, when the liquid in the column 6 is replaced by the highly viscous liquid, the highly viscous liquid is supplied at a constant pressure, and is supplied at a constant flow rate after reaching a predetermined flow rate.

Therefore, in the case of changing a type of the liquid of the mobile phase and performing the analysis in the chromatograph 1, an excessive pressure can be suppressed from being applied to the column 6, and the operability for the user can be improved.

7. Modified Example

In the embodiments described above, it is described that the replacement is started from the state in which the analysis operation is stopped when the mobile phase in the column 6 is replaced by the mobile phase having different viscosity. However, the mobile phase in the column 6 may be replaced by the mobile phase having different viscosity in the state in which the analysis operation is continued, and at that time, the control operation described above may be performed.

Moreover, in the embodiments described above, it is described that, when the mobile phase in the column 6 is replaced by the mobile phase having different viscosity, the mobile phase is supplied at the pressure of which setting is received by the setting receiving unit 431, and is supplied at a constant flow rate after reaching the flow rate of which setting is received by the setting receiving unit 431. However, the chromatograph 1 may be provided with a storage unit, and these controls may be performed based on a pressure and a flow rate, which are stored in advance in the storage unit.

Furthermore, in the embodiments described above, it is described that the chromatograph 1 is a device that functions as the liquid chromatograph and the supercritical fluid chromatograph. However, the present invention is also applicable to a chromatograph that functions as only either one of the liquid chromatograph and the supercritical fluid chromatograph.

What is claimed is:

1. A method for controlling a chromatograph comprising a column, a pump to supply a second mobile phase to the column, a setting receiving unit configured to receive a first setting providing a set flow rate, and a flow rate control unit configured to calculate a flow rate of the second mobile phase while the second mobile phase is supplied to the column at a predetermined constant pressure and to determine whether the flow rate calculated by the flow rate control unit matches the set flow rate, the method comprising the steps of:
receiving by the setting receiving unit the first setting providing the set flow rate;
starting a supply of the second mobile phase, having different viscosity from a first mobile phase in the column, to the column with the pump to replace the first mobile phase in the column by the second mobile phase for a new analysis;
calculating the flow control unit the flow rate of the second mobile phase;
determining by the flow rate control unit whether the calculated flow rate matches the set flow rate;
controlling the operation of the pump for the supply of the second mobile phase at a predetermined constant pressure by the flow rate control unit after the step of starting to supply the second mobile phase until a flow rate of the second mobile phase reaches the set flow rate; and
controlling the operation of the pump for the supply of the second mobile phase at the set flow rate by the flow rate control unit after the flow rate of the second mobile phase reaches the set flow rate.

2. The method according to claim 1, wherein
the method further comprises the steps of:
receiving by the setting receiving unit a second setting providing a set pressure, and
controlling by the flow rate control unit when the first mobile phase in the column is replaced by the second mobile phase having different viscosity, the flow rate of the second mobile phase so that the second mobile phase is supplied at the set pressure according to the second setting by the setting receiving unit, and is supplied at a constant flow rate after reaching the set flow rate according to the first setting received by the setting receiving unit.

3. The method according to claim 2, wherein the chromatograph further comprises:
a display unit; and
a display control unit for causing the display unit to display a setting screen for setting the set pressure and the set flow rate,
wherein the setting receiving unit receives the first and second setting in the setting screen.

4. The method according to claim 1, the method further including:
- a step of controlling by the flow rate control unit when a first liquid in the column is replaced by a second liquid having higher viscosity than the first liquid, a flow rate of the second liquid so that the second liquid is supplied at a constant pressure, and is supplied at a constant flow rate after reaching a predetermined flow rate.

5. The method according to claim 1, wherein the second mobile phase is carbon dioxide in a supercritical state.

6. The method according to claim 1,
- wherein the chromatograph further comprises a first pump for supplying a carbon dioxide, a second pump for supplying a first liquid, and a third pump for supplying a second liquid,
- wherein the second mobile phase is the carbon dioxide, and
- wherein the method further comprises controlling the first pump to operate at the predetermined constant pressure until the flow rate of the carbon dioxide reaches the set flow rate.

\* \* \* \* \*